UNITED STATES PATENT OFFICE.

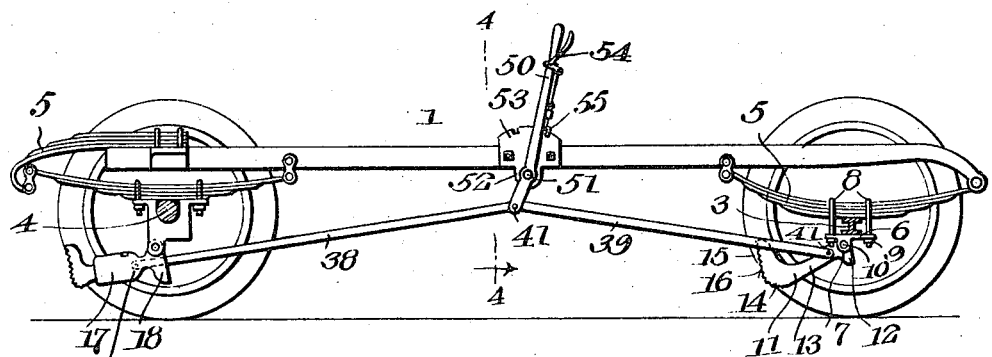
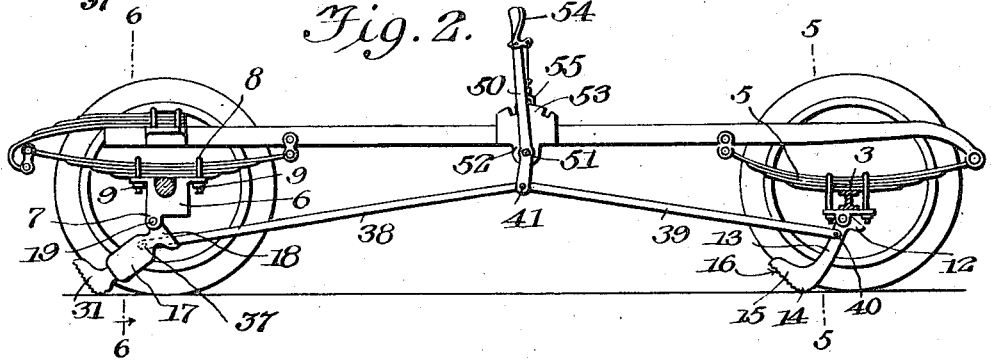
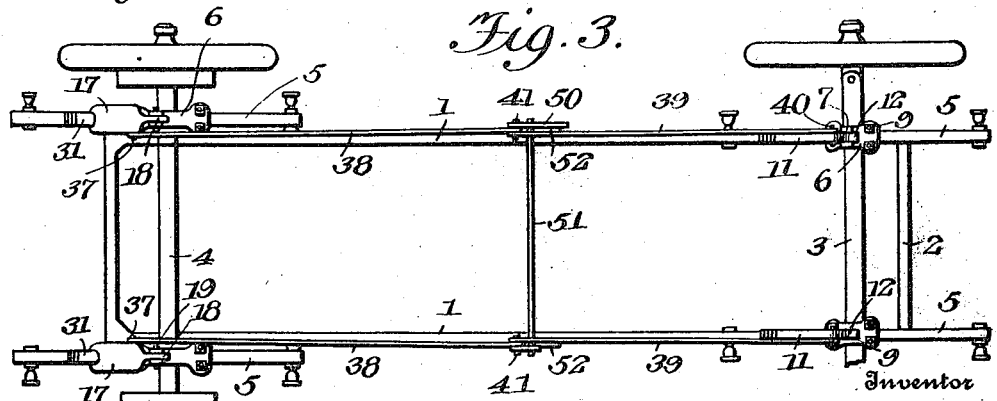

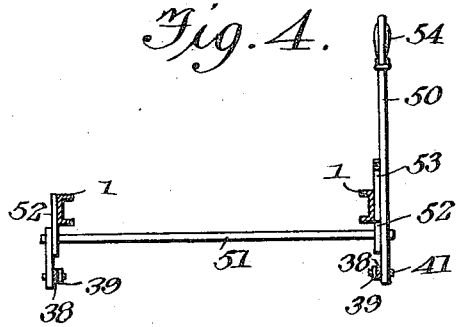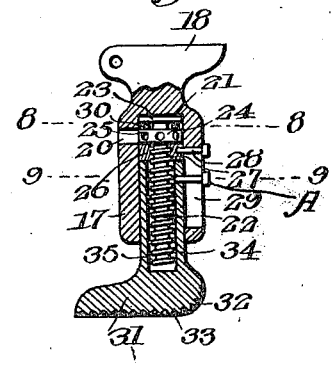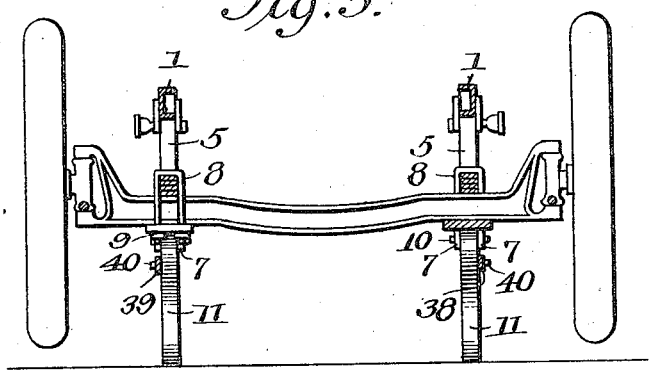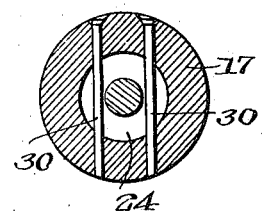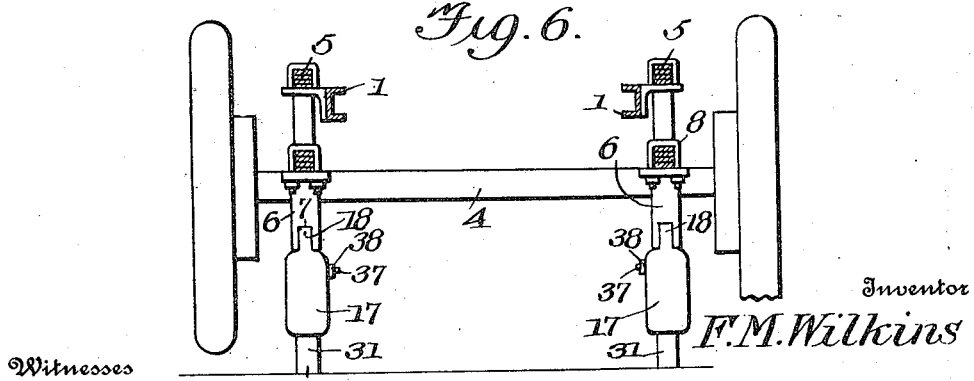

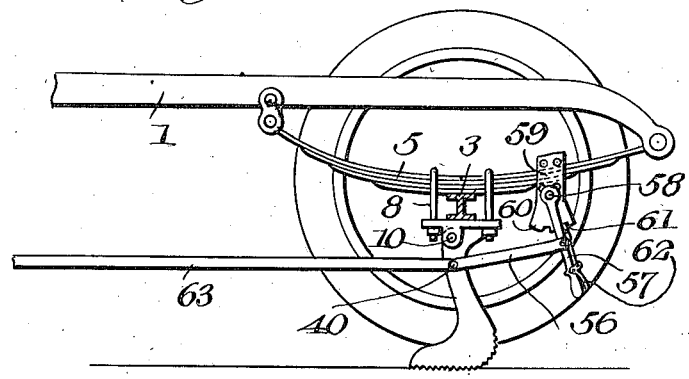
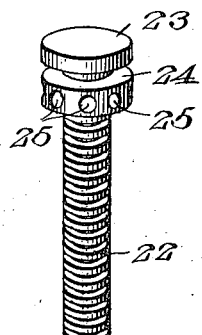
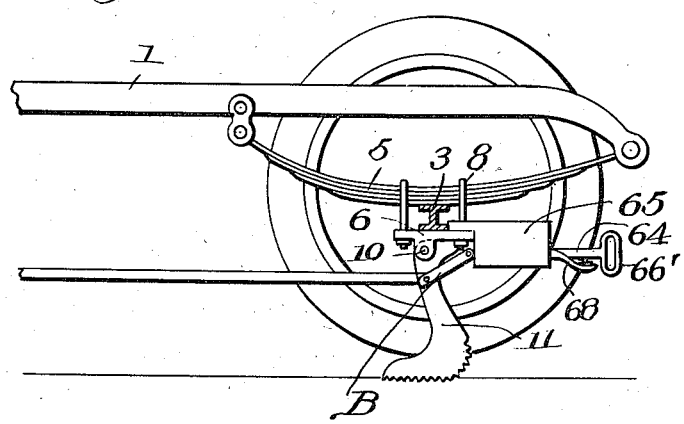
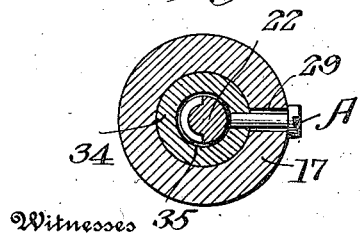
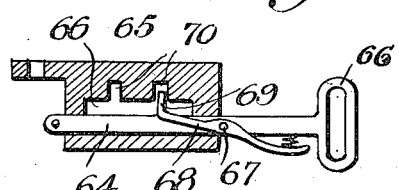

FREDERICK M. WILKINS, OF DORCHESTER, MASSACHUSETTS, ASSIGNOR OF ONE-HALF TO CHARLES R. BRAINERD, OF CAMBRIDGE, MASSACHUSETTS.

SUPPORTER.

1,155,856. Specification of Letters Patent. Patented Oct. 5, 1915.

Application filed June 2, 1914. Serial No. 842,519.

*To all whom it may concern:*

Be it known that I, FREDERICK M. WILKINS, a citizen of the United States, residing at Dorchester, in the county of Suffolk and State of Massachusetts, have invented new and useful Improvements in Supporters, of which the following is a specification.

The present invention relates to auto rests, the object of the invention being to provide a device in the nature of an attachment to an automobile, the said device remaining attached to the machine and being, when necessary, actuated to elevate the automobile so that the wheels may be out of contact with the floor, ground or other surface upon which the automobile has previously been rested.

A further object of the invention is to provide a device of this character which is capable of being operated by the driver without leaving his seat in the machine.

A still further object of the invention is to provide a construction of jack or rest, the parts of which being so arranged upon the machine as to give the necessary road clearance and without interfering with the operation of the machine.

With the above and other objects in view, the improvement resides in the construction, combination and arrangement of parts set forth in the following specification and falling within the scope of the appended claims.

In the drawings: Figure 1 is a side elevation of the running gear or chassis of an automobile with my improvement arranged thereon, the jack members being shown in their raised position, Fig. 2 is a similar view but illustrating the arrangement of the jacks previous to the operation of the engine for actuating the said jacks to swing the same upon a floor or roadbed. Fig. 3 is a bottom plan view with the jacks in the position illustrated in Fig. 1, Fig. 4 is a transverse sectional view approximately on the line 4—4 of Fig. 1, Fig. 5 is a sectional view on the line 5—5 of Fig. 2, Fig. 6 is a sectional view on the line 6—6 of Fig. 2, Fig. 7 is a central vertical longitudinal sectional view taken through one of the jacks, Fig. 8 is a sectional view on the line 8—8 of Fig. 7, Fig. 9 is a detail elevation illustrating the manner whereby the jacks may be operated from one end of the car, Fig. 10 is a view illustrating a still further manner in which the jack may be operated, Fig. 11 is a horizontal sectional view approximately on the line 9—9 of Fig. 7, Fig. 12 is a detail perspective view of the screw employed upon the rear jacks, and Fig. 13 is a central longitudinal sectional view taken through the housing 65.

In the drawings I have illustrated a conventional form of automobile truck or chassis which includes the usual longitudinally extending side bar 1 and connecting or end bars 2.

The front axle is indicated by the numeral 3, the rear axle by the numeral 4, and 5 designates the springs arranged between the truck and the axles. Secured in convenient places upon the axles 3 and 4 and adapted to rest upon the lower faces of the same are bolster plates 6, which are provided each with a pair of spaced downturned ears 7 formed upon what I will term the rear edge of the said plates. The plates 6 are provided adjacent their longitudinal edges with a plurality of openings arranged in spaced pairs, each adapted to receive the legs of substantially U-shaped bolts 8 which, in the present instance, are arranged over the springs 5 to the opposite sides of the axles, nuts 9 being employed for engaging the ends of the bolts which project below the bolster plates 6. Pivotally secured, as at 10, between each pair of ears of the bolster plates 6 is a jack 11. The jacks employed at the front wheels of the vehicle are preferably formed of a single member including each a head 12 which, when the said jack is swung into operative position, is adapted to rest directly upon the plate 6 forward of its pivotal connection with the ears of the said plate. The said jacks 11 also include a body or leg member 13 which is arranged at an angle to its head 12. Each of the legs 13 is provided with an offset portion forming a foot 15, the outer corner at the juncture of said foot and leg being round, as at 14, and the outer edge of each of the legs is serrated, as at 16. The round portion 14 provides a heel for the jack.

The rear jacks each includes a body portion 17 having a head 18 which is pivotally connected at one of its corners between the ears of each of the rear bolster plates, as indicated by the numerals 19. Each body 17 has a round bore 21 which enters from its outer edge. Each body, below its head 18, is provided with a transverse opening 20 which communicates with its bore 21. Arranged within the bore 21 of each of the body members 17 is a screw member 22, the same having its upper edge formed with a head 23 which contacts with the upper wall of the bore 21. Each screw 22 is provided, at a distance below its head, with an angular flange or enlargement 24 which is arranged opposite the transverse openings 20 in the body, and which is provided with radially disposed openings 25. A suitable tool, such as a pinch bar, may be inserted through the opening 20 to engage with one of the radially disposed openings 25 in the member 24 and moved laterally of the said opening to actuate the screw 22.

The numeral 26 designates a block having a central, preferably threaded opening 27, through which the screw 22 extends. The block 26 is retained within the bore 21 of the body, through the medium of a bolt 28 which passes through a longitudinally extending slot 29 provided in the body 17.

The numerals 30 designate two transverse bolts which pass through the body 17 as well as through the bore thereof, and these bolts are arranged directly below the head 23 of the screw to support the said head.

The foot members 31 of each of the jack screws has a rounded heel 32, and the heel as well as the underface of the foot is serrated, as at 33. Formed with and extending angularly of the heel and foot is a leg or shank member 34 which is provided with a bore 35 for the reception of the screw 22.

To prevent the rotation of the leg members 34 after the same have been adjusted within the body 17, a pin A may be passed through an opening in the said leg, and the said pin being arranged within the slot 29, so that a rotary movement of the said leg will cause the sides of the pin A to contact with the sides of the slot 29. Pivotally connected with the body members 17 of each of the rear jack screws, as at 37, is a rod 38, a second pair of rods 39 being each pivotally secured, as at 40, to one of each of the jacks 7, below the heads thereof. The oppositely extending longitudinally arranged pairs of rods 38 and 39 have their meeting ends connected through the medium of a pivot bar 41.

The numeral 50 designates a lever which is preferably arranged adjacent to one side of the frame or chassis. This lever is connected with the pivot 41 of the rods 38 and 39, and is also pivoted, as at 51, to a bracket 52 which is secured upon one of the side bars 1 of the frame or chassis, while preferably integrally formed with the bracket is a toothed segment 53. The lever is provided with a spring pressed handle 54 that in turn is secured to a slidable detent or locking pawl which coacts with the toothed segment 53. When the lever is arranged as illustrated in Fig. 1 of the drawings, the jack members are swung to an upward position, each being moved to such position in the same direction and being arranged adjacent the wheels of the vehicle above the roadbed and out of the path of contact with any obstruction that the vehicle may meet in traveling upon the roadbed. When the lever is swung to the position illustrated in Fig. 2 the heel portion 14 of the forward jacks will first contact with the floor or roadbed to elevate the front wheels, the heel of the rear jacks just contacting with the floor or roadbed. The propelling mechanism of the automobile is started in a rearward direction, swinging the feet 31 of the rear jack screw to bring the same entirely upon the floor or roadbed.

In some instances it may be desirable to operate the jacks from the exterior of the car, and so a short rod member 57 may be pivotally connected with the front jacks, and arranged upon the pivot 40 if desired, (see Fig. 9). The lever 57 is approximately centrally pivoted to the rod 56. This lever has one of its ends pivoted, as at 58, to the face of a bracket 59 which is secured, in the said showing, to one of the said springs 5. The bracket is provided with a segmental tooth member 60. The lever is provided with a spring pressed pawl 61, actuated by a suitable handle 62 pivotally secured to the lever 57. A connecting rod 63, similar to one of the rods 38 is pivotally connected with the jack.

In Fig. 10 of the drawings I have illustrated a still further manner of operating the jacks. With this arrangement I provide a rod 64. The rod 64 is arranged for longitudinal movement through a passage 66 provided in a housing 65 and one of the ends of the rod has pivotally connected thereto a link B which is connected with one of the jacks. One of the longitudinal walls provided by the passage 66 is formed with a pair of spaced openings 70, and the rod has pivoted thereon, as at 67, a spring pressed pawl 68 having an offset end 69 which is adapted to engage with either of the depressions 70 to hold the rod in one of two positions; i. e., to retain the jack in either its raised or lowered position. The outer end of the rod is provided with a handle 66'.

Having thus described the invention, what I claim is:

1. In combination with a vehicle, of bolster members resting upon the axles of the vehicle and secured to the running gear thereof, a jack including a flat head pivotally connected with each of the bolsters, means for sustaining the jacks longitudinally of the running gear, means for swinging the jacks to bring their heads into contact with the bolsters to arrange the same vertically with respect to the running gear to elevate the wheels of the vehicle.

2. In combination with the running gear of a vehicle, of bolster plates arranged upon the axles of the vehicles to the inner faces of the wheels thereof, detachable means for securing the bolsters to the said axles, each of the bolster plates having spaced ears, a jack having a flat head pivotally secured to each of the bolster plates between the ears thereof, each of said jacks including a body having an offset foot and a round heel, means for swinging the jacks to sustain the same longitudinally with respect to the running gear, means for swinging the jacks in an opposite direction to cause the rounded heels thereof to first contact with the roadbed and to have their feet rest upon their roadbed and their heads engage with the flat faces of the bolster plates.

In testimony whereof I affix my signature in presence of two witnesses.

FREDERICK M. WILKINS.

Witnesses:
 ARTHUR G. McVEY,
 CHARLES R. BRAINERD.